J. M. ANDERSEN.
TIME SWITCH.
APPLICATION FILED JULY 23, 1908.

1,156,126.

Patented Oct. 12, 1915.
3 SHEETS—SHEET 1.

Witnesses.
C. H. Gannett.
J. Murphy

Inventor:
Johan M. Andersen
by Jas. H. Churchill
Atty.

J. M. ANDERSEN.
TIME SWITCH.
APPLICATION FILED JULY 23, 1908.

1,156,126.

Patented Oct. 12, 1915.
3 SHEETS—SHEET 2.

Witnesses.
C. H. Gannett
J. Murphy

Inventor.
Johan M. Andersen
by Jas. H. Churchill
Atty.

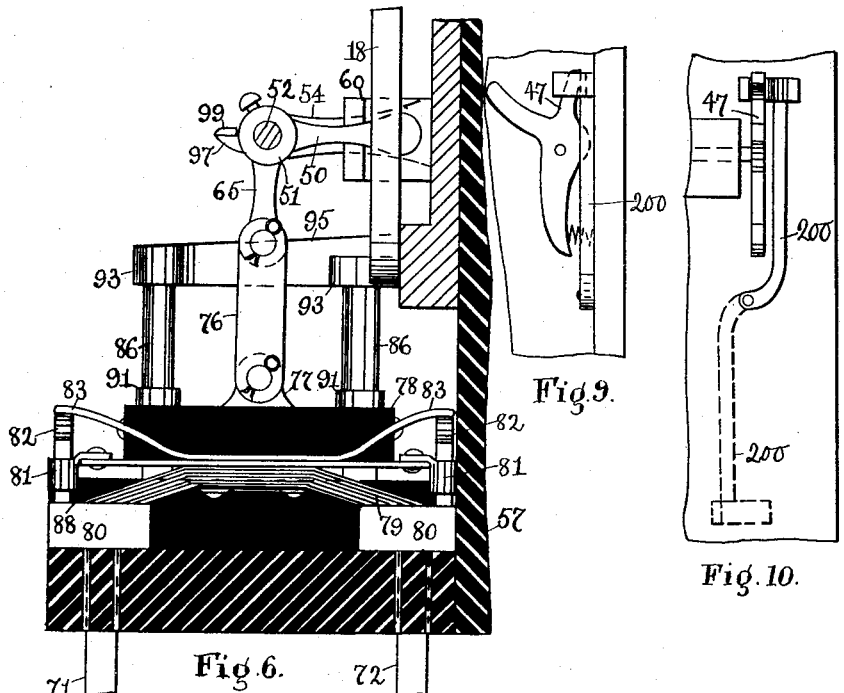
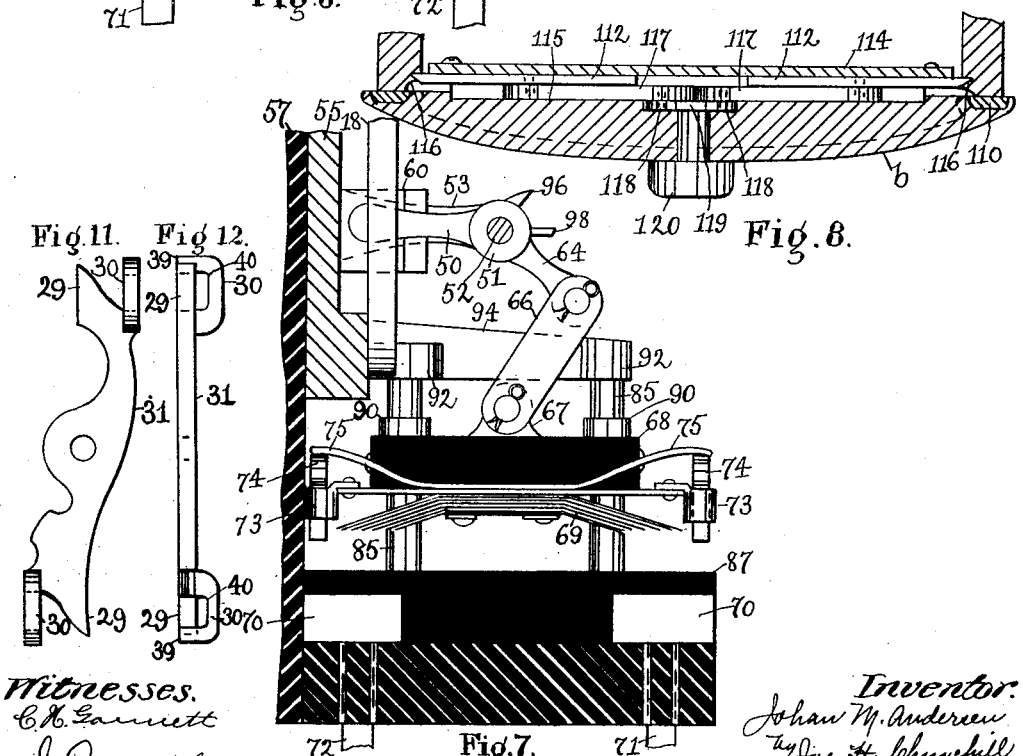

UNITED STATES PATENT OFFICE.

JOHAN M. ANDERSEN, OF BOSTON, MASSACHUSETTS, ASSIGNOR TO ALBERT AND J. M. ANDERSON MANUFACTURING COMPANY, OF BOSTON, MASSACHUSETTS, A CORPORATION OF MAINE.

TIME-SWITCH.

1,156,126.   Specification of Letters Patent.   Patented Oct. 12, 1915.

Application filed July 23, 1908. Serial No. 444,979.

*To all whom it may concern:*

Be it known that I, JOHAN M. ANDERSEN, a citizen of the United States, residing in Boston, county of Suffolk, and State of Massachusetts, have invented an Improvement in Time-Switches, of which the following description, in connection with the accompanying drawings, is a specification, like letters on the drawings representing like parts.

This invention relates to a time switch or circuit controlling apparatus of the class shown and described in U. S. Patent No. 779,249 granted to me January 3, 1905, and has for its object to improve the construction of the same and more particularly the circuit controlling portion thereof and the mechanism for operating the same.

The invention further has for its object to provide means for rendering the circuit controller independent of the time mechanism at the will of the operator.

The invention further has for its object to provide means as will be described, whereby the operative parts of the mechanism are protected from dirt and moisture, so that the apparatus may be located out-doors and exposed to the weather without danger of impairing the efficiency of the same.

These and other features of this invention will be pointed out in the claims at the end of this specification.

Figure 1:
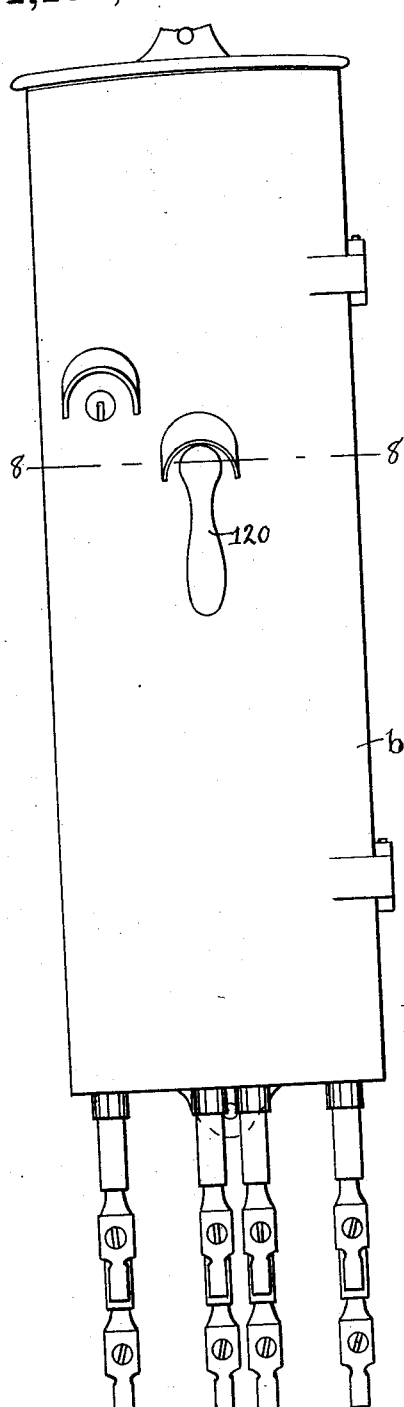
Figure 2:
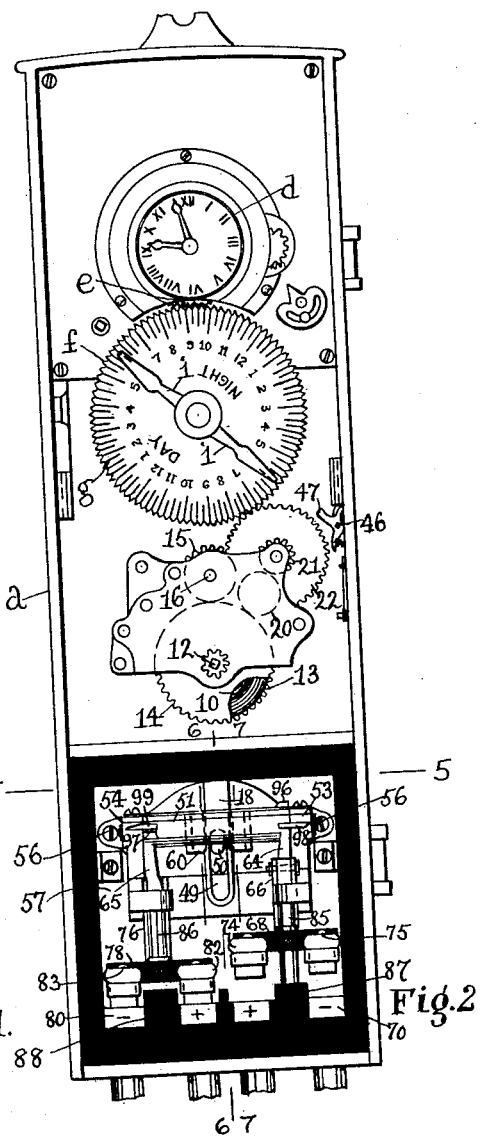
Figure 3:
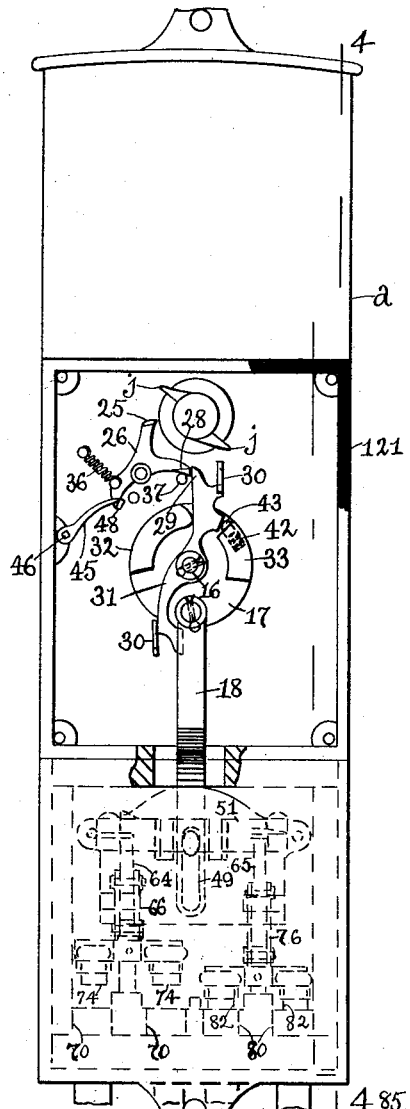
Figure 5:
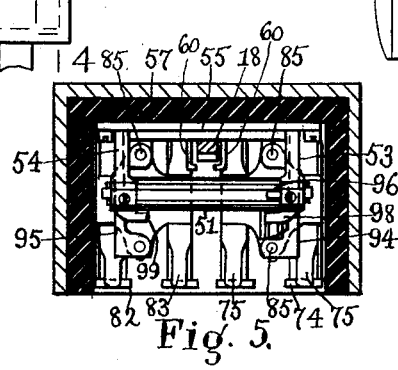
Figure 4:
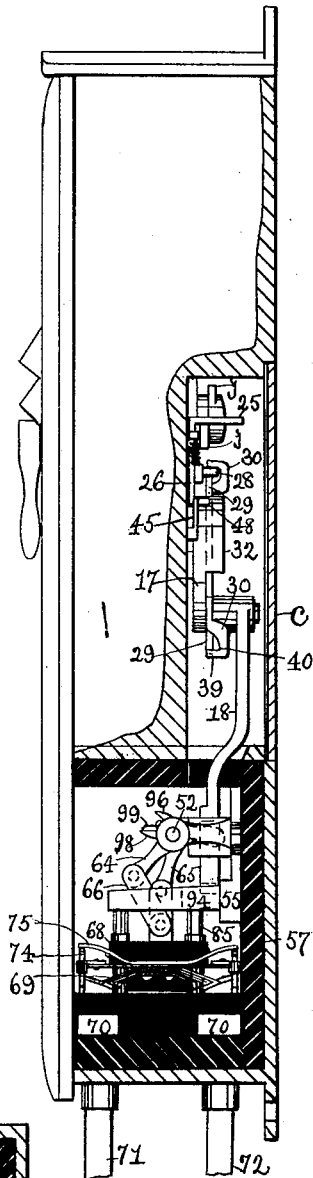

Figure 1 is a front elevation of a time switch embodying this invention. Fig. 2, a front elevation of the apparatus shown in Fig. 1, with the door removed. Fig. 3, a rear elevation of the apparatus shown in Fig. 1 with the back plate removed. Fig. 4, a vertical section on the line 4—4, Fig. 3. Fig. 5, a detail in section on the line 5—5, Fig. 2. Fig. 6, an enlarged vertical section on the line 6—6, Fig. 2. Fig. 7, an enlarged vertical section on the line 7—7, Fig. 2. Fig. 8, an enlarged sectional detail on the line 8—8, Fig. 1. Figs. 9 and 10, details to be referred to, and Figs. 11 and 12, details of the detent lever to be referred to.

Referring to the drawings, $a$ represents a metal box provided with a movable front plate $b$ hinged to the box and constituting a door therefor, and with a removable back plate $c$, by means of which and the door $b$, access may be had to the operative parts of the mechanism within the box.

The operative parts within the box $a$ consist of a circuit controller, a motor mechanism for operating said circuit controller, a selective mechanism for selecting the time at which the motor mechanism should operate, and a time movement or clock mechanism for actuating the selective mechanism.

The time movement, selective mechanism and motor mechanism are substantially the same as the same parts shown and described in the patent referred to, except as to features as will be hereinafter pointed out, whereas the circuit controller is of a construction as will be described.

Referring to Fig. 2, $d$ represents the time movement, which is located at the top of the box or case and drives a gear $e$, which meshes with the peripherally toothed disk $f$ of the selective device having the radial slots $g$, into which extend fingers on the hands or levers $i$ with which are connected the dogs $j$ (see Fig. 3) governing the operation of the motor mechanism for the circuit controller.

The motor mechanism comprises a coiled spring 10 (see Fig. 2) in a barrel mounted on a shaft 12 and provided with gears 13, 14, the gear 13 meshing with a pinion 15 on a shaft 16, having fast on it at the back of the box or case a disk 17 (see Fig. 3) to which the link or rod 18 is eccentrically connected. The motor mechanism is connected with the toothed disk $f$ by gears 14, 20, 21, 22. The parts as thus far described are and may be substantially such as shown and described in the patent referred to, except as to particular features as will be described. In the present instance, the releasing dogs $j$ coöperate with a finger 25 on the escapement lever 26 controlling the motor mechanism, and said lever is provided with a finger 28, which coöperates with two detent arms 29, 30 on each end of the detent bar or lever 31, which is loose on the shaft 16 and extends between two bosses 32, 33 on the disk 17. The detent arms 29, 30 are separated from each other a slight distance to permit of the least possible rotation of the disk so as to effect movement of the connecting rod 18 a limited distance without operating the circuit controller, for a purpose as will be described.

The detent arms 29, 30 are made of unequal length so that the finger 28 may be disengaged from one detent arm as 29 and then engage the detent arm 30 until the releasing dog $j$ has been moved out of engagement with the finger 25, whereupon the spring 36 moves the finger 28 toward the disk 17 until arrested by the front stop 37. During this movement of the finger 28, the latter is disengaged from a lug 39 on the detent arm 30 (see Figs. 4 and 12) and brought into line with a recess or arch 40 in said arm, which leaves the detent lever 31 and the disk 17 free to be rotated by the motor or spring 10, one half or substantially one half a revolution, at which time the detent arm 29 on the other end of the lever 31 is brought into engagement with the finger 28 on the escapement lever, with which it remains engaged until released by one of the dogs $j$ engaging the finger 25 to operate the escapement lever 26 as above described. The boss 33 is provided with a socket for the reception of a spring 42 and a button or plug 43, which engages the lever 31 and serves to cushion the blow of the arms 29 against the lug 28 on the escapement lever. Provision is made for manually releasing the motor mechanism, independently of the dogs $j$ and also for rendering the clock mechanism inoperative upon the motor mechanism, and for this purpose, I have provided a crank or arm 45 on a rock-shaft 46 extended to the front of the case or box and provided at that end with a finger lever or arm 47 (see Fig. 2) by turning which the shaft 46 may be rocked so as to engage a projection 48 on the escapement lever 26 and turn the latter so as to disengage the finger 28 from the detent arm 29 and engage it with the lug 39 of the arm 30, after which, upon releasing the lever or arm 47, the spring 36 operates to disengage the finger 28 from the lug 39 and detent arm 30, and thus allow the motor to operate the switch. In this manner, the switch may be manually controlled without interfering with the clock mechanism, and in some instances it may be desirable to disconnect the clock from the switch and allow the latter to remain in the position it is in, when the disconnection is made, without stopping the clock mechanism. This latter result may be obtained by providing means for locking or holding the manually operated tripping device in active engagement with the escape lever, whereby the latter is retained in engagement with the detent arm 30 until the manually operated tripping device is released from active engagement with the escape.

In the present instance, I have provided a device in the form of a lever 200 (see Figs. 9 and 10), which is capable of being interposed between the arm 47 and the side of the box, so as to prevent the arm 47 returning to its normal position. As long as the lever 200 is thus engaged with the arm 47, the crank 45 is held in engagement with the finger 48 on the escape lever, and the finger 28 of said lever remains in engagement with the lug 39 of the detent arm 30 and the motor is held inoperative, while the clock mechanism is free to run. It will thus be seen that the condition of the circuit controller and of the circuit governed thereby, may be disconnected from the clock mechanism and remains so, subject to the will of the operator.

It will be noticed that a single finger on the escape lever coöperates with two arms on the detent lever, which construction enables the detent arms to be placed close together, so that very little movement of the motor is lost in the release from the escape lever, thereby obtaining practically the full momentum of the disk 17 on each half revolution for closing or opening the switch, which is an important feature of this invention.

One of the features of the present invention consists in providing a novel construction of switch and its operating mechanism, whereby efficiency and reliability are obtained with a compact structure. To this end the connecting link or bar 18 is provided with a slot 49 in its lower end, into which extends a crank or arm 50 attached to a rocking device, which is herein shown as a sleeve 51 mounted to turn on a pin or rod 52 supported by studs or arms 53, 54, attached to a metal casting or supporting frame 55, which is fastened as by screws 56 to a wall or lining 57 of hard rubber or other insulating material suitably secured to the back wall of the lower part of the box or case $a$. The metal frame 55 is preferably provided with lugs 60 between which the slotted end of the link or rod 18 reciprocates and which are separated sufficiently to allow for the lateral movement of the lower end of the connecting link, due to the eccentric connection of its upper end with the disk 17. The crank or arm 50 on the rock-shaft or sleeve 51 is made narrower than the slot 49 in the connecting rod or link 18, to permit the latter to move laterally, and is provided with substantially straight sides and with curved upper and lower ends to conform to the curved end walls of the slot 49, whereby the link or rod 18 may rock on the rounded surfaces of the crank or arm, as its upper end is carried by the disk 17 in a circular path.

The rocking device 51 is connected with the movable member or members of the circuit controller, and in the present instance, it is connected to two movable members, so that one is in its closed position when the other is in its open position. For this purpose, the rock-shaft or sleeve 51 is provided with two cranks or arms 64, 65 located near the opposite ends of said sleeve and extended therefrom at different angles, after the manner represented in Figs. 4, 6 and 7. The crank or arm 64 is joined by links 66 to a lug 67, which is suitably secured to a block 68 of insulating material, which forms a carrier for the movable member or members of a circuit controller.

In the present instance, the carrier 68 has secured to its underside a pair of movable members 69, preferably composed of laminations or strips of copper, which coöperate with two sets of stationary members 70, each set comprising two metal blocks with which are connected the line terminals 71, 72 extended through the bottom of the case. The carrier 68 has also secured to it two sets 73 of slotted guide arms, which receive two sets of auxiliary contact members 74 preferably carbon blocks or pieces, which coöperate with the two sets of stationary contact members 70, and are provided as shown with enlarged heads to prevent their being forced down through the slotted guide arms 73 by the springs 75, which serve to yieldingly engage the auxiliary contact members with the stationary members when the switch is closed. The crank or arm 65 is connected in like manner by links 76, with a lug 77 secured to the carrier 78 for the movable members 79 of the companion circuit controller, which members coöperate with stationary contact members 80. The carrier 78 has secured to it slotted guide arms 81 carrying the auxiliary contact members 82, which are engaged by the springs 83, the same as above described.

The carriers 68, 78 and their attached contact members are bodily movable toward and from their coöperating stationary members, which is effected by oscillating the rocking device or sleeve 51, and provision is made for guiding the said carriers in their bodily movement, which is effected by upright rods or posts 85 for the carrier 68 and by uprights or posts 86 for the carrier 78. The posts 85 are erected from a piece or wall 87 of insulating material interposed between the positive and negative stationary members 70 of one switch, and the posts 86 are erected from a piece or wall 88 of insulating material interposed between the positive and negative stationary members 80 of the other switch. The walls 87, 88 of insulating material preferably extend above the stationary contact members 70, 80, so as to form arc-interrupting walls. The carriers 68, 78, may be provided with metal sleeves or bushings 90, 91, which slide on the guide rods, and the latter may be supported at their upper ends by lugs 92, 93 attached to arms 94, 95 extended from the metal plate or frame 55. Provision is made for limiting the oscillating movement of the rocking device or sleeve 51, and for this purpose, said device or sleeve is provided with lugs or projections 96, 97, which coöperate with stationary lugs or projections 98, 99 on the arms 53, 54, which support the rod 52 on which said sleeve or rock-shaft oscillates. The stationary lugs 98, 99 constitute stops and are arranged substantially in line with each other, and the movable lugs 96, 97 on the rock shaft or sleeve 51 are located on opposite sides of the line joining said stops. As a result, when the sleeve or rock-shaft 51 is moved in one direction, one of its lugs as 96 is moved toward its coöperating stop 98, and the other lug 97 is moved away from its stop 99, and when the rock-shaft 51 is moved in the opposite direction, the lug 96 is moved away from its stop 98, and the lug 97 is moved toward its stop 99.

The cranks or arms 64, 65 on the rock-shaft coöperate with the links 66, 76, to form toggles, and when the shaft 51 is rocked in one direction, one of the toggles is straightened to move the movable members 79 of one switch into engagement with the stationary members thereof and thus close the said switch, while the other toggle is moved into its inclined position to remove the movable contact members 69 of the other switch away from their coöperating members, and thus open the said other switch, and vice versa.

With the arrangement herein shown, the switch at the left of the box (viewing Fig. 2) is closed, and that at the right of the box is opened by the link or connecting rod, on what might be termed its downward movement, and on the upward movement of said rod, the positions of the switches are reversed.

The operation of the switch in general is substantially the same as described in the patent referred to, the operator selecting the time at which it is desired the switch or switches should be opened and closed, by moving one or both hands $i$ into engagement with the slot $g$ corresponding to the time at which the switch should be operated. As represented in Fig. 2, the hands $i$ are engaged with the diametrically opposite slots $g$ numbered 6, which places the releasing dogs $j$ opposite each other and into position to release the motor 10 at six o'clock in the morning and again at six o'clock at night.

When the clock arrives at six o'clock, the motor is first partially released and is then fully released to throw the switches substantially in an instant and effect a quick opening and closing of the same. At each release of the motor, the disk 17 is given a half turn. In the present instance, the apparatus is shown as provided with two switches which are operated oppositely, each switch being of the kind known as the double break type.

Time switches are often located in exposed places, and it is desirable that the operative parts should be protected from dust and moisture, and the present invention further has for its object to provide the box or case with means for rendering the same dust and water proof. To this end the door $b$ of the box is provided on its inner side with a groove around it into which is cemented a packing strip 110 of rubber or other suitable material, and the box is provided on its sides, top and bottom with an edge with which the rubber strip coöperates, and against which the rubber strip is forced by sliding bars 112 (see Fig. 8) movable in a suitable guideway in a plate 114, which is screwed to a cross piece 115 on the inner side of the door. The sliding bars 112 are wedge-shaped at their outer ends and coöperate with lugs 116 on the inner surface of the sides of the box, said bars being joined by links 117 with studs or pins 118 eccentrically located on a disk 119 rotatably mounted in a socket in the cross piece 115 and provided on the outside of the cover with a handle 120. By turning the handle 120 into the position shown in Fig. 1, the slide bars are moved transversely of the box in opposite directions and their wedge-shaped ends are forced into engagement with the lugs 116, with the result that the door is drawn to its seat, with the edge of the box firmly pressed into the packing strip 110. In this manner the box is effectively protected on its front side against moisture, dirt, etc., and on its back, said box is protected by providing a packing strip 121 between the removable plate $c$ and the walls of the opening in said back.

Claims.

1. In an apparatus of the class described, in combination, a circuit controller provided with a movable member, a motor to move said member, a time train or clock mechanism, a selective mechanism operated thereby, a detent device rotatable by said motor, an escapement lever provided with a finger coöperating with the detent device to restrain said motor and with a second finger coöperating with said selective mechanism to enable the latter to disengage the first-mentioned finger from said detent device, and a rock-shaft provided with an arm coöperating with the escapement lever to turn the same and remove the escapement lever from the influence of the selective mechanism and also to disengage the first-mentioned finger from the detent device, substantially as described.

2. In an apparatus of the class described, in combination, a circuit controller provided with a movable member, a motor to move said member, a disk rotated by said motor, a connecting link eccentrically and pivotally connected with said disk at one end and provided at its other end with a slot, a rocking device, a toggle mechanism connecting said rocking device with said movable member, an arm on said rocking device extended radially therefrom and into the slot of said link, a time train or clock mechanism, and a selective device operated by said clock mechanism and controlling the said motor, substantially as described.

3. In an apparatus of the class described, in combination, a motor, a detent device rotatable by said motor and provided at its opposite ends with a plurality of detents in substantially close proximity to each other, an escapement lever provided with a finger coöperating with said detents at each end of said device in succession, a tripping device to actuate said escapement lever, a selective mechanism actuating said tripping device, and a time train or clock mechanism for operating said selective mechanism, substantially as described.

4. In an apparatus of the class described, in combination, a motor, a detent lever rotatable by said motor and provided at its opposite ends with detent arms separated from but in close proximity to each other, an escapement lever provided with a finger coöperating with the detent arms at each end of the said detent lever in succession, a tripping device to actuate said escapement lever, a selective mechanism actuating said tripping device, and a time train or clock mechanism for operating said selective mechanism, substantially as described.

5. In an apparatus of the class described, in combination, a motor, a disk rotated by said motor, a detent lever rotatable with said disk, an escapement lever coöperating with said detent lever, a tripping device for said escapement lever, a selective device for operating said tripping device, a time train for operating said selective device, a rock shaft provided with a crank coöperating with said escapement lever to remove the latter from the influence of the said tripping device and to disengage the escapement lever from the detent lever, and means for holding said rock-shaft in its active position, substantially as described.

6. In an apparatus of the class described, in combination, a circuit controller provided with a movable member, a motor to move said member, a time train or clock mechanism, a selective mechanism operated thereby, a detent device rotatable by said motor, an escapement lever provided with a finger coöperating with the detent device to restrain said motor and with a second finger coöperating with said selective mechanism, a rock-shaft provided with an arm coöperating with the escapement lever to effect manual release of the motor, and means coöperating with said rock-shaft to hold it in engagement with the escapement lever and maintain the escapement lever out of the influence of the selective mechanism, substantially as described.

7. In an apparatus of the class described, in combination, a time train or clock mechanism, a selective mechanism operated thereby, a motor governed by said selective mechanism, a rocking device on one side of its axial center, mechanism connecting said rocking device with said motor, a movable member of a circuit controller, a carrier therefor, and a toggle mechanism connecting said carrier with said rocking device on the opposite side of its axial center, substantially as described.

8. In an apparatus of the class described, in combination, a time train or clock mechanism, a selective mechanism operated thereby, a motor governed by said selective mechanism, a rocking device, mechanism connecting said rocking device with said motor, cranks or arms extended from said rocking device at different angles, independently movable members of circuit controllers, and means connecting said movable members with said cranks or arms to effect movement of the movable members in opposite directions when said device is rocked, substantially as described.

9. In an apparatus of the class described, in combination, a time train or clock mechanism, a selective mechanism operated thereby, a motor governed by said selective mechanism, a rocking device, mechanism connecting said rocking device with said motor, cranks or arms extended from said rocking device at different angles, independently movable members of circuit controllers, and means connecting said movable members with said cranks or arms to effect movement of the movable members in opposite directions when said device is rocked, and stops to limit the movement of said rocking device in opposite directions, substantially as described.

10. In an apparatus of the class described, in combination, a time train or clock mechanism, a selective mechanism operated thereby, a motor governed by said selective mechanism, a rocking device, mechanism connecting said rocking device with said motor, a plurality of movable members of circuit controllers, and means to connect said movable members to said rocking device to simultaneously move in opposite directions, substantially as described.

11. In an apparatus of the class described, in combination, a time train or clock mechanism, a selective mechanism operated thereby, a motor governed by said selective mechanism, a vertically movable device operated by said motor, a vertically movable circuit controlling member, and a rocking device interposed between said vertically movable circuit controlling member and said vertically movable device and operatively connected with both, substantially as described.

12. In an apparatus of the class described, in combination, a time train or clock mechanism, a selective mechanism operated thereby, a motor governed by said selective mechanism, a reciprocating device actuated by said motor mechanism, a movable member of a circuit controller, a reciprocating carrier therefor, a rocking device interposed between said carrier and said reciprocating device and actuated by the latter, and a toggle mechanism connecting said carrier with said rocking device, substantially as described.

In testimony whereof, I have signed my name to this specification in the presence of two subscribing witnesses.

JOHAN M. ANDERSEN.

Witnesses:
 Jas. H. Churchill,
 J. Murphy.

Copies of this patent may be obtained for five cents each, by addressing the "Commissioner of Patents, Washington, D. C."